Patented Oct. 18, 1927.

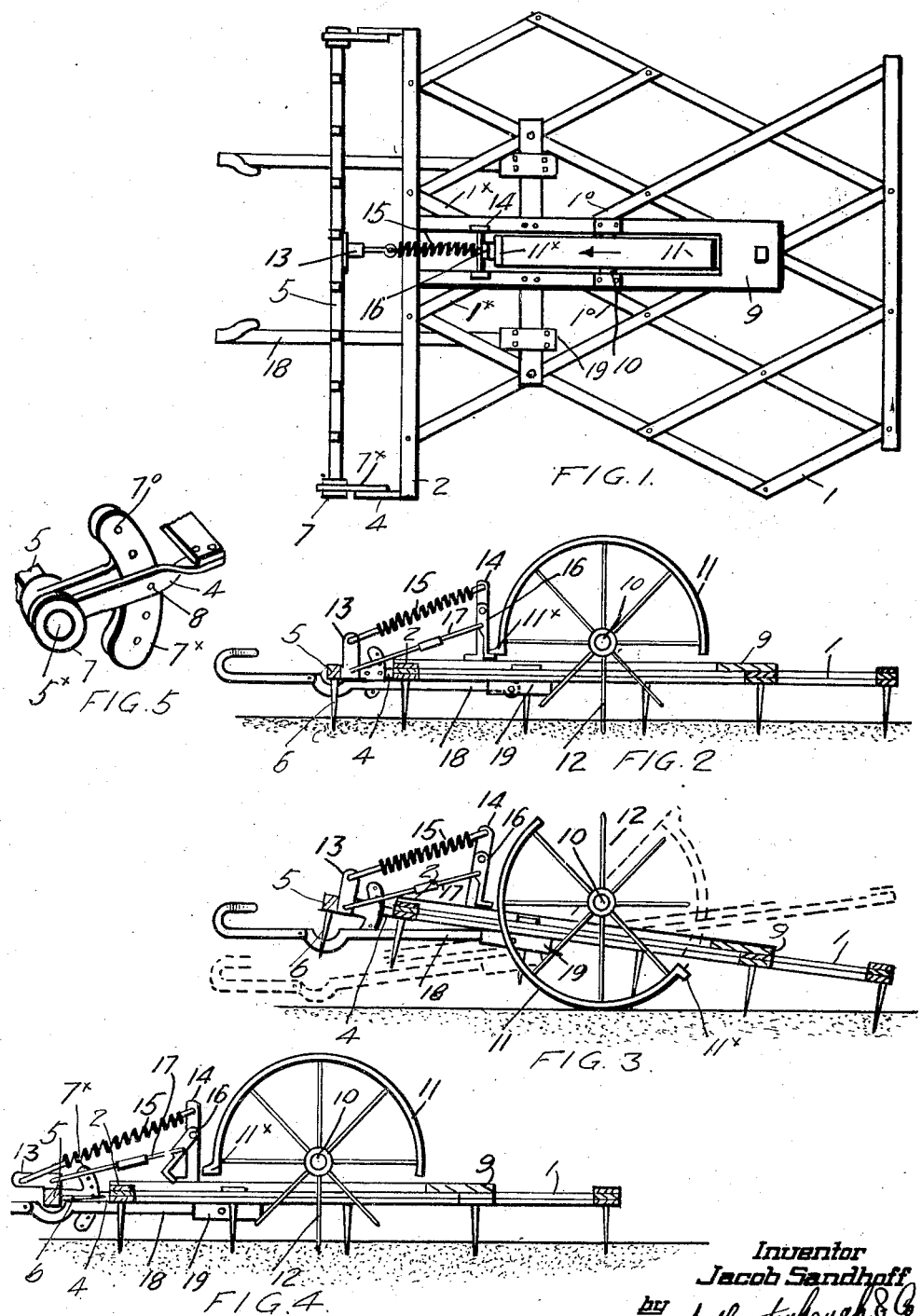

1,645,933

UNITED STATES PATENT OFFICE.

JACOB SANDHOFF, OF SASKATOON, SASKATCHEWAN, CANADA.

WEEDING ATTACHMENT FOR LAND HARROWS.

Application filed August 16, 1926. Serial No. 129,517.

My invention relates to improvements in weeding attachments for land harrows, and the object of the invention is to devise a weeder, which will automatically clear itself periodically from weeds and other matter gathered thereby and it consists essentially of the arrangement and construction of parts as hereinafter more particularly explained.

Fig. 1, is a plan view of a harrow section and my weeder attached.

Fig. 2, is a vertical section showing the parts in the normal position.

Fig. 3, is a similar view to Fig. 2 showing the parts in the weed clearing position.

Fig. 4, is a similar view to Figs. 2 and 3 showing the weeder in the released position prior to tilting to the position shown in Fig. 3.

Fig. 5, is a detail of the adjustable rake bracket.

In the drawings like characters of reference indicate corresponding parts in each figure.

1 indicates a harrow section of ordinary construction. 2 is the front bar of the section. 4 are arms extending from the ends of the front bar.

5 is a rake bar provided with teeth 6. The bar 5 is provided with cylindrical ends $5^x$ journalled in the brackets 7 provided with an arc-shaped portion $7^x$ provided with a series of orifices $7^o$ arranged concentrically to the centre of swing of the arm 4 upon the bracket 7. 8 is a pin adapted to pass through the arm 4 into any one of the orifices $7^o$ to adjust the position of the rake teeth in relation to the ground. 9 is a frame secured to the harrow, the bars $1^x$ and $1^o$ being cut away and secured to the frame. 10 is an axle secured to the frame 9 and extending across the open portion and on which is secured a half wheel 11 provided with an end projection $11^x$. 12 are spoke teeth extending from the hub of the half-wheel 11 to engage the ground successively.

13 is a bracket secured to the rake bar 5 centrally thereof. 14 are standard brackets carried by the frame 9. 15 is a tension spring connected at one end to the bracket 13 and at the opposite end to the brackets 14.

16 is a pivoted latch carried by the brackets 14 and upon the turned free end of which rests the projection $11^x$ holding the halfwheel in its normal position.

17 is a link rod connected at one end to the latch 16, and at the opposite end to the bracket 13.

18 are draft links, which are pivotally mounted to brackets 19 suitably secured to the harrow frame.

Having described the principal parts involved in my invention, I will briefly describe the operation of the same.

When gathering weeds the pins 8 are first withdrawn.

As the harrow section travels over the land in the direction of the arrow the rake teeth 6 travelling in advance thereof gather the weeds and other loose material until the weight of such material forces the teeth back to the horizontal position shown in Fig. 4, thus drawing the latch 16 out of engagement with the projection $11^x$, so as to free the halfwheel 11.

The spoke teeth 12 engaging the ground revolve the halfwheel 11 into contact with the ground tilting the harrow frame to the full line position shown in Fig. 3.

As the rake teeth 6 are carried to the rearward position the weeds are drawn therefrom and as the front portion of the harrow is tilted up such weeds pass beneath to the centre of the machine. As the halfwheel completes its turning movement the harrow frame tilts in the opposite direction indicated by dotted lines, so that the weeds pass beneath the rear portion of the machine.

After the teeth 6 of the rake are cleared of weeds they are carried back to the normal position by the spring 15.

When finally raking over the land after the weeds have been removed the pins 8 are inserted to hold the rake teeth at the required angle to suit the condition of the land and leave it in proper condition for seeding.

What I claim as my invention is:

1. The combination with the harrow section, of a toothed bar extending transversely across and yieldingly pivoted on the front of the harrow and thereby rockably supported for automatically releasing weeds when overloaded, means normally locked for tilting first the front and then the rear of the harrow to permit of the passage of weeds freed from the tooth bar beneath the harrow section, and means operated by the rearward swing of the tooth bar for releasing such locked means.

2. The combination with the harrow section adapted to tilt on a transverse axis, of a toothed bar extending transversely across and pivoted on the front of the harrow section and spring held in a vertical position, means for releasably locking the harrow section in its normal position, means operated by the rearward swing of the toothed bar for releasing such locking means, and means for tilting the front and rear harrow sections alternately into engagement with the ground when such locking mechanism is released.

3. The combination with the harrow section, of a toothed bar extending transversely across and pivoted to the front of the harrow, a half wheel revolvably mounted on the harrow normally out of ground contact and with the open side thereof facing downward, releasable means operated by the rearward swing of the tooth bar for holding the half wheel in its normal position, spoke teeth extending from the open side of the wheel into the ground, a latch engaging the forward portion of the wheel, and means operated by the rearward swing of the tooth bar for releasing the latch.

4. The combination with the harrow section, of a rake extending transversely across and pivoted on the front of the harrow, a half wheel revolvably mounted on the harrow normally out of ground contact and with the open side thereof facing downward, spoked teeth extending from such open side into the ground, a latch engaging the forward portion of the wheel, a bracket carried by the tooth bar, a link connecting the bracket and latch, and a tension spring connecting the bracket to a stationary support.

JACOB SANDHOFF.